United States Patent [19]

Tamano

[11] Patent Number: 5,526,529
[45] Date of Patent: Jun. 11, 1996

[54] TRANSMISSION LEVEL CONTROL SYSTEM AND METHOD IN RADIO COMMUNICATION STATION

[75] Inventor: Chinami Tamano, Tokyo, Japan

[73] Assignee: NEC Corporation, Japan

[21] Appl. No.: 209,451

[22] Filed: Mar. 10, 1994

[30] Foreign Application Priority Data

Mar. 11, 1993 [JP] Japan .................................. 5-050284

[51] Int. Cl.⁶ ........................................................ H04B 1/04
[52] U.S. Cl. ........................... 455/103; 455/116; 455/126
[58] Field of Search .................................. 455/126, 127, 455/102, 103, 115, 116, 93, 89, 129

[56] References Cited

U.S. PATENT DOCUMENTS

| | | | |
|---|---|---|---|
| 5,101,176 | 3/1992 | Norimatsu | 455/126 X |
| 5,187,809 | 2/1993 | Rich et al. | 455/89 X |
| 5,257,415 | 10/1993 | Kumagai et al. | 455/126 |
| 5,369,789 | 11/1994 | Kosugi et al. | 455/127 X |

FOREIGN PATENT DOCUMENTS

| | | |
|---|---|---|
| 0275118 | 7/1988 | European Pat. Off. |
| 63-1219 | 6/1988 | Japan ................................. 455/127 |

OTHER PUBLICATIONS

Patent Abstracts of Japan, vol. 15, No. 236 (E–1078) Jun. 18, 1991; JP–A–03 071 731.
Patent Abstracts of Japan, vol. 15, No. 288 (E–1092) Apr. 26, 1991; JP–A–03 101 525.

Primary Examiner—Chi H. Pham
Assistant Examiner—Philip J. Sobutka
Attorney, Agent, or Firm—Ostrolenk, Faber, Gerb & Soffen

[57] ABSTRACT

In a transmission level control system in a radio communication station where an in-station apparatus is connected with an antenna site through a transmission line, the in-station apparatus includes a plurality of burst carrier transmitters, and the antenna site comprises a level controller for controlling the carrier level so as to compensate the received carriers for level reduction stemming from the transmission line. The in-station apparatus comprises a carrier combiner for combining the transmitted burst carriers to transmit them to the antenna site through the transmission line, a selector for selecting one of the burst carrier transmitters, and a controller for activating the level control operation of the level controller only when only the burst carrier transmitter selected by the selector outputs the transmitted carrier, otherwise inhibiting. In cases where there are some continuous carriers in the transmitted carriers, the level control operation is activated only when all the transmitted carriers are continuous carriers, otherwise inhibited.

12 Claims, 4 Drawing Sheets

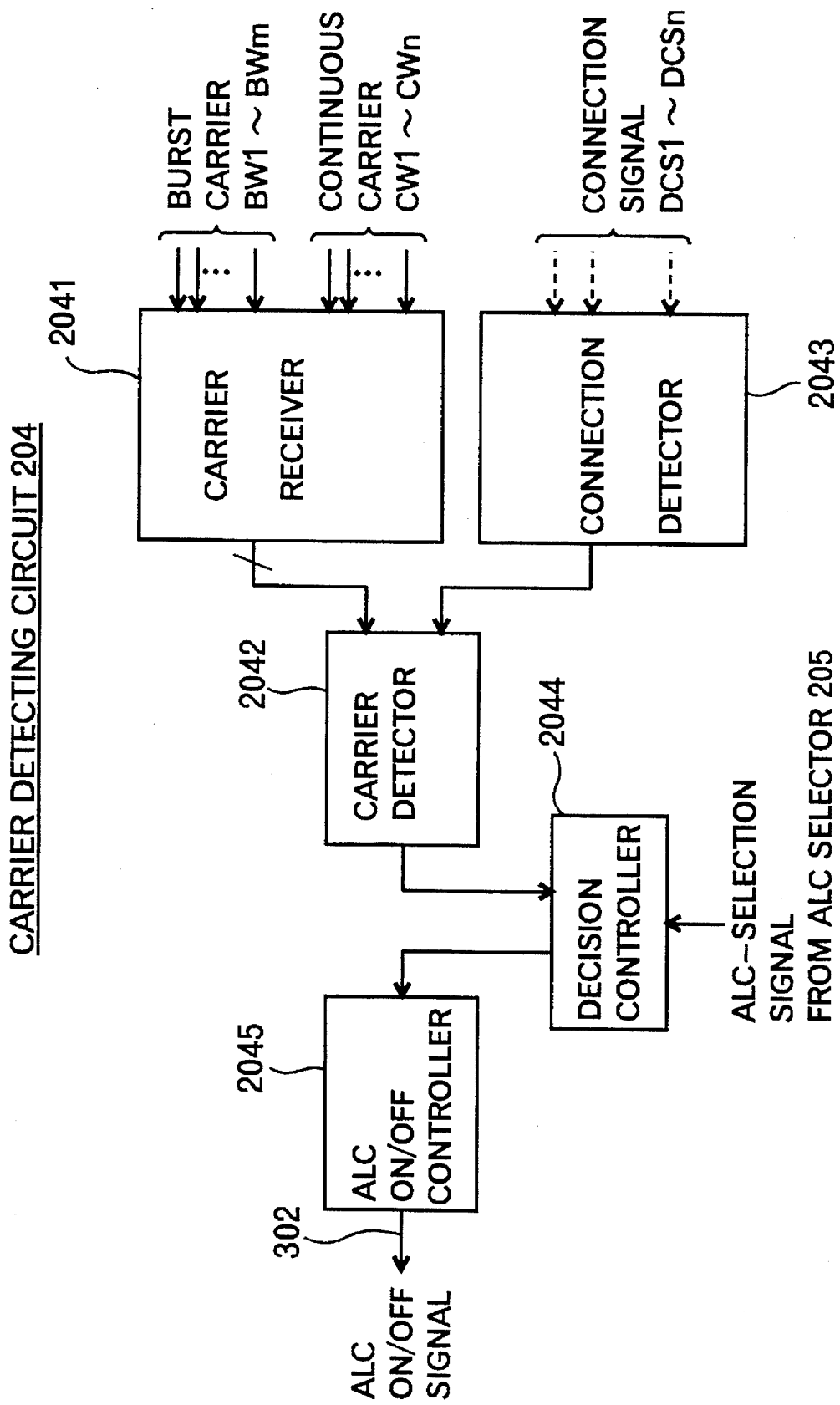

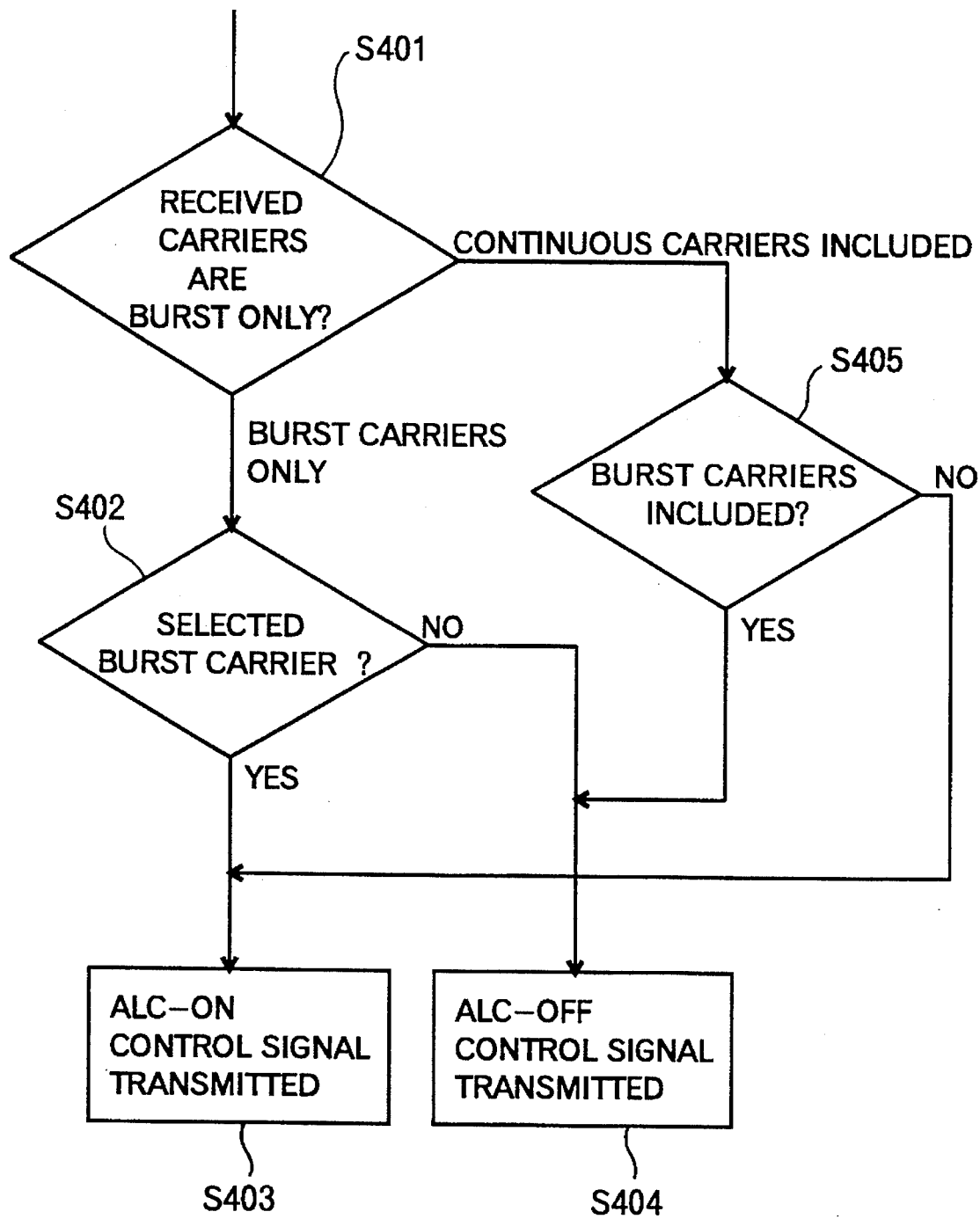

TRANSMISSION LEVEL CONTROL SYSTEM AND METHOD IN RADIO COMMUNICATION STATION

FIELD OF THE INVENTION

The present invention relates to a transmission level control in radio communication, and more particularly, to a transmission level control system and method in a radio communication station where transmission carriers combine to be transmitted through a transmission line to an antenna site where transmission processing such as level control and power amplification is carried out to transmit it by radio.

BACKGROUND OF THE INVENTION

With the remarkable progress of satellite communication technique in recent years, the satellite communication has become vigorously utilized in various applications such as satellite broadcasting, public communication, and the like. With such a trend, there have been earth stations having various sizes and structures ranging from a large scale station for public communication which is provided with an antenna of 10 meters in diameter to a domestic satellite broadcast receiver.

A large scale station, in general, employs an arrangement in which the communication apparatus placed within the station house is connected with the antenna site by a transmission line. A schematic arrangement of a transmission system in such an earth station is shown in FIG. 1.

Referring to FIG. 1, the antenna site 1 is connected with the in-station apparatus 2 through the transmission line 3. Since the carriers received from the in-station apparatus 2 is subject to level reduction stemming from the transmission line 3, the antenna site 1 is provided with an automatic level control (ALC) circuit for controlling the carrier level so as to compensate the received carriers for the level reduction. Further transmission processing, such as conversion of the transmission frequency, is carried out, and the resulting carriers are amplified in power by means of the HPA (high power amplifier) to emit from the antenna toward the satellite.

Typically, such an earth station is necessary to combine a plurality of carriers for emitting them from a single antenna simultaneously. In the in-station apparatus 2, a multi-carrier controller 4 is comprised of a carrier combiner 5 for combining the carriers received from the burst carrier transmitters (BWT) with the continuous carrier transmitters (CWT). The combined carriers are transmitted to the ALC of the antenna site 1 through the transmission line 3 together with the calculated combined level of the carriers.

The burst carrier and the continuous carrier mentioned above mean a short isolated sequence of modulated carriers and a continuous modulated carrier, respectively.

The multi-carrier controller which combines various transmission carriers and calculates the combined level is disclosed in Japanese Patent Laid-Open No. 3-71731. Using the transmission time of each carrier which is measured for each period of time, the controller performs automatic power control such that the transmission output power is kept stable with the number of the transmission carriers varying.

According to the foregoing conventional transmission level control system, all the received carriers combine in the carrier combiner 5 to be transmitted to the ALC apparatus through the transmission line 3 regardless of whether a received carrier is a burst carrier or a continuous carrier, and based on that combined level, the automatic level control is performed by the ALC apparatus in the antenna site 1. However, since the burst carrier instantaneously varies in level, the level detection and the computation for level control become extremely complicated, resulting in complication of the level control operation and then a costly control system.

SUMMARY OF THE INVENTION

An object of the present invention is to provide a transmission level control system and method which achieve a simple and low-cost level control for compensating the combined carriers for level reduction stemming from the transmission line connecting the in-station communication apparatus and the antenna site.

In a radio communication station having an arrangement in which an in-station communication apparatus is connected with an antenna site through a transmission line, the in-station communication apparatus includes a plurality of burst carrier transmitters, and the antenna site is provided with a level controller for controlling the level of the carriers received from the in-station communication apparatus so as to compensate the received carriers for level reduction stemming from the transmission line.

In a transmission level control system according to the present invention, the in-station communication apparatus is further comprised of a carrier combiner for combining the transmitted burst carriers to transmit the combined carriers to the antenna site through the transmission line; a selector for selecting one of the burst carrier transmitters; and a controller for activating the level control operation of the level controller in the antenna site only when only the burst carrier transmitter selected by the selector outputs the transmitted carrier.

Preferably, the controller inhibits the level controller performing the level control operation but performing level amplification with the previous control gain when at least one transmitted burst carrier is output from a burst carrier transmitter other than that selected by the selection means.

Since the level controller performs the level control operation in order to compensate the received carriers for level reduction stemming from the transmission line, the level control can be made based on the transmitted carrier output from the selected transmitter.

In cases where there are some continuous carriers in the transmitted carriers, the level control operation is activated only when all the transmitted carriers are continuous carriers, otherwise inhibited.

BRIEF DESCRIPTION OF DRAWINGS

FIG. 3 is a block diagram illustrating a specific example of the carrier detecting circuit 204 according to the present embodiment; and FIG. 4 is a flow chart illustrating a control operation of the carrier detecting circuit 204 in the present embodiment.

DESCRIPTION OF THE PREFERRED EMBODIMENTS

Figure 1:
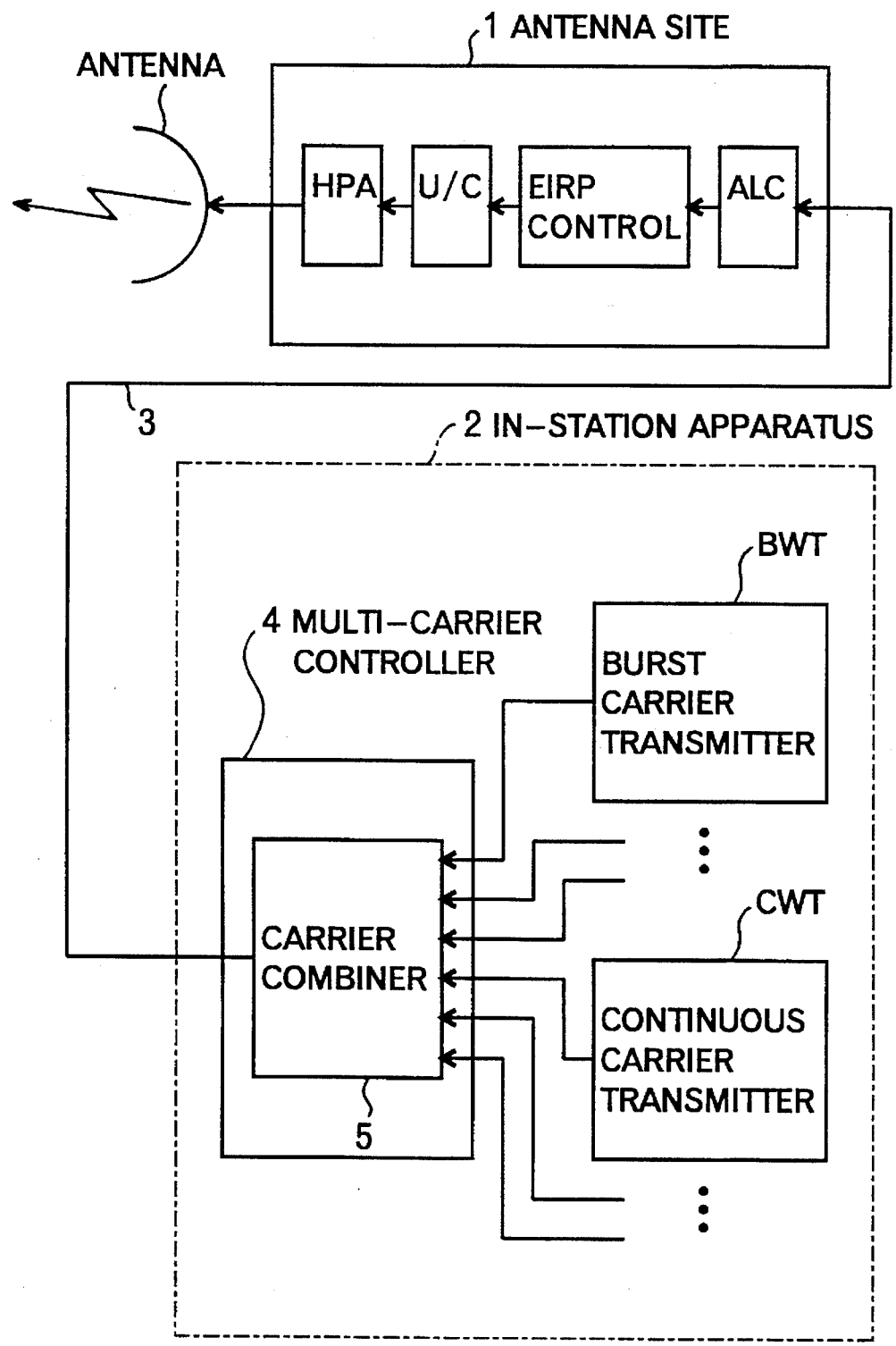
FIG. 1 is a schematic diagram illustrating a conventional transmission level control system in an earth station.
Figure 2:
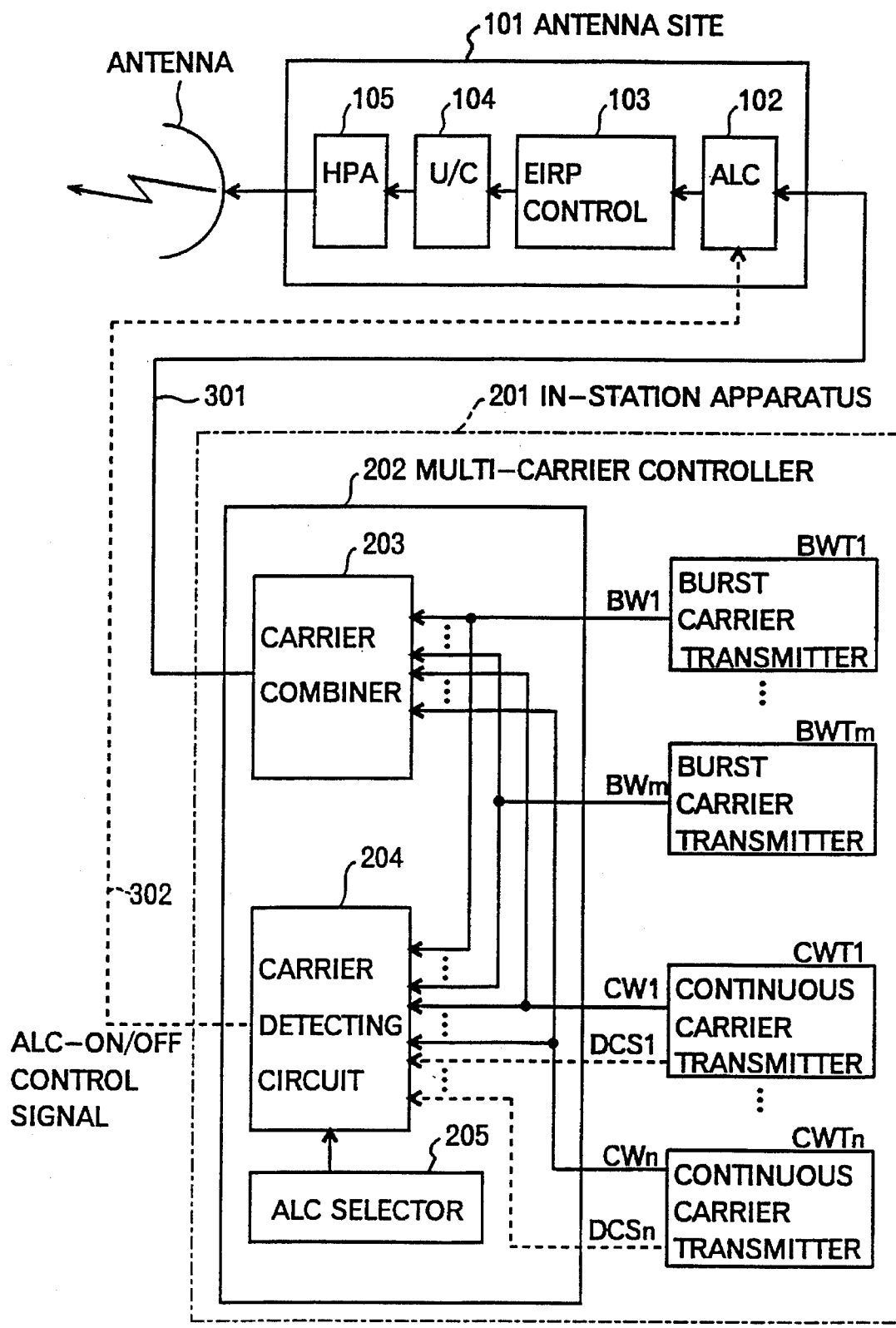
FIG. 2 is a block diagram illustrating a specific embodiment of the transmission level control system according to the present invention.

Referring to FIG. 2, the earth station has an arrangement where an antenna site 101 is connected to an in-station communication apparatus 201 through a transmission line 301. The antenna site 101 is comprised of an automatic level control (ALC) circuit 102, an effective-isotropically-radiated-power (EIRP) controller 103, an up converter (U/C) 104, and a high power amplifier (HPA) 105.

The ALC circuit 102 automatically controls the level of the combined carriers received from the in-station apparatus 201 so as to compensate those carriers for level reduction stemming from the transmission line 301. The ALC operation is made by using the combined level calculated by the multi-carrier controller 202. However, the ALC operation is stopped by an ALC-OFF control signal of an ALC-ON/OFF control signal 302 received from the in-station apparatus 201 until an ALC-ON control signal is received. When the ALC-OFF control signal is received, the ALC operation is stopped, whereas the level amplification is carried out in the immediately preceding ALC condition or degree of amplification.

The in-station apparatus 201 is comprised of a multi-carrier controller 202, a plurality of burst carrier transmitters BWT1 through BWTm, and a plurality of continuous carrier transmitters CWT1 through CWTn. The burst carrier transmitter emits a burst carrier modulated by a transmission signal as in voice communication.

The multi-carrier controller 202 is comprised of a carrier combiner 203, a carrier detecting circuit 204, and an ALC selector 205. The carrier combiner 203 combines carriers received from the burst carrier transmitters BWT1 through BWTm and the continuous carrier transmitter CWT1 through CWTn to send out the combined carriers to the antenna site 101 through the transmission line 301. The carrier detecting circuit 204 transmits the ALC-ON/OFF control signal 302 to the ALC circuit 102. The ALC-ON/OFF control signal 302 is generated by the carrier detecting circuit 204 which detects the burst carriers BW1 through BWm emitted from the respective burst carrier transmitters BWT1 through BWTm, the continuous carriers CW1 through CWn from the respective continuous carrier transmitters CWT1 through CWTn, and connection signals DCS1 through DCSn from the respective continuous carrier transmitters CWT1 through CWTn.

The ALC selector 205 emits a selection signal to the carrier detecting circuit 204, the selection signal indicating one burst carrier transmitters selected by, for example, an operator. Based on the burst carrier from the selected burst carrier transmitter, the ALC circuit 102 performs the ALC control.

As illustrated in FIG. 3, the carrier detecting circuit 204 receives the burst carriers BW1–BWm and the continuous carriers CW1–CWn through a carrier receiver 2041. The received carriers are transferred to the carrier detector 2042 to detect which of transmitters is transmitting its carrier. Further, a connection detector 2043 detects which of continuous carrier transmitters is sending its connection signal, and the detected result is sent to the carrier detector 2042.

A determination controller 2044 receives the ALC-selection signal from the ALC selector 205 and the output of the carrier detector 2042 to determine whether to carry out the ALC control or not. According to that determination result, the ALC-ON/OFF controller 2045 transmits the ALC-ON/OFF control signal 302 to the ALC circuit 102.

Next, the operation of this embodiment is described with reference to FIG. 4. On receipt of carriers, the carrier detector 2042 determines whether the received carriers consist of the burst carriers only or not (S401). If the received carriers include only the burst carriers, it is determined whether the received carrier outputs only from the burst carrier transmitter selected by the ALC selector 205 or not (S402). If it is the selected burst carrier, the ALC-ON control signal is sent out to the ALC circuit 102 (S403). If not, the ALC-OFF control signal is sent out to the ALC circuit 102 (S404).

If it is determined in step S401 that the received carriers include some continuous carriers, then it is further determined whether that carriers include some burst carriers or not (S405). If yes, the ALC-OFF control signal is sent out (S404) and, if that carriers include only continuous carriers, then the ALC-ON control signal is sent out (S403).

To be more specific, a case in which the burst carrier transmitters BWT1 through BWTm are connected to the multi-carrier controller 202 for satellite communication is described. In that case, let us assume that a burst carrier transmitter BWTj is selected by the ALC selector 205 for ALC operation.

If one of the burst carriers BW1 through BWm is entered to the carrier detecting circuit 204, control is shifted to the next step S402 where it is determined whether this received carrier is the selected carrier BWj or not. If the carrier BWj, the ALC-ON control signal is emitted to the ALC circuit 102 of the antenna site 101 (S403). In this case, the ALC circuit 102 carries out the ALC control by using the calculated level of the burst carrier BWj received through the transmission line 301. On the other hand, if the received carrier is not the carrier BWj, the ALC-OFF control signal is emitted to the ALC circuit 102 (S404). In this case, the ALC circuit 102 stops the ALC control operation and amplifies the power with the immediately preceding gain. Next, if the received carriers include only the continuous carriers including no burst carriers, then the ALC-ON control signal is sent to the ALC circuit 102 (S403) so that the ALC operation as in conventional control is carried out by using the combined level of the continuous carriers. On the other hand, if the received carriers include both of a burst carrier and a continuous carrier, then the ALC-OFF control signal is emitted to the ALC circuit 102 (S404). Therefore, the ALC operation is stopped to be followed by fixed amplification with the previous control gain.

What is claimed is:

1. A transmission level control system for a radio communication station having an in-station communication apparatus connected to an antenna site by a transmission line, the transmission level control system comprising:

said in-station communication apparatus including;

a plurality of burst carrier transmitters for transmitting burst carriers, respectively, a carrier combiner connected to said burst carrier transmitters, for combining at least one burst carrier of said burst carriers to output a transmission signal to said antenna site through said transmission line, selection means selecting a single burst carrier transmitter from said plurality of burst carrier transmitters, and control means outputting a level-control activating signal to said antenna site when only said single burst carrier transmitter outputs a burst carrier and outputting a level-control halting signal to said antenna site when a burst carrier transmitter other than said single burst carrier transmitter outputs another burst carrier, and said antenna site including;

a level controller for performing a level control of said transmission signal received from said in-station communication apparatus through said transmission line, said level controller performing said level control while receiving said level-control activating signal from said control means, and said level controller halting said level control while receiving said level-control halting signal from said control means.

2. The system according to claim 1, wherein said selection means is an automatic level control selector.

3. The system according to claim 1, wherein said control means is a carrier detecting circuit.

4. The system according to claim 1, wherein said level controller performs level amplification of said transmission signal with a fixed gain while receiving said level-control halting signal from said control means, said fixed gain having a level-control value immediately before said level controller receives said level-controller halting signal.

5. A transmission level control system for a radio communication station having an in-station communication apparatus connected to an antenna site by a transmission line, the transmission level control system comprising:

said in-station communication apparatus including;

a plurality of burst carrier transmitters for transmitting burst carriers, respectively, a plurality of continuous carrier transmitters for transmitting continuous carriers, respectively, a carrier combiner connected to said burst carrier transmitters and said continuous carrier transmitters, for combining at least one carrier of said burst carriers and said continuous carriers to output a transmission signal to said antenna site through said transmission line, selection means selecting a single burst carrier transmitter from said plurality of burst carrier transmitters, and control means outputting a level-control activating signal to said antenna site when only said single burst carrier transmitter outputs a burst carrier, said control means outputting said level-control activating signal to said antenna site when said transmission signal includes only a continuous carrier, said control means outputting a level-control halting signal to said antenna site when a burst carrier transmitter other than said single burst carrier transmitter outputs said burst carrier, and said control means outputting said level-control halting signal to said antenna site when said transmission signal includes both a burst carrier and a continuous carrier, and said antenna site including;

a level controller for performing a level control of said transmission signal received from said in-station communication apparatus through said transmission line, said level controller performing said level control while receiving said level-control activating signal from said control means, and said level controller halting said level control while receiving said level-control halting signal from said control means.

6. The system according to claim 5, wherein said selection means is an automatic level control selector.

7. The system according to claim 5, wherein said control means is a carrier detecting circuit.

8. The system according to claim 5, wherein said level controller performs level amplification of said transmission signal with a fixed gain while receiving said level-control halting signal from said control means, said fixed gain having a level-control value immediately before said level controller receives said level-control halting signal.

9. A method of transmission level control for a radio communication station having an in-station communication apparatus connected to an antenna site by a transmission line, said in-station communication apparatus including a plurality of burst carrier transmitters for transmitting burst carriers, respectively, and said antenna site including a level controller for performing a level control of said transmission signal received from said in-station communication apparatus through said transmission line, said method comprising the steps of:

at said in-station communication apparatus;

combining at least one burst carrier of said burst carriers to output a transmission signal to said antenna site through said transmission line, selecting a single burst carrier transmitter from said burst carrier transmitters, outputting a level-control activating signal to said antenna site when only said single burst carrier transmitter outputs a burst carrier, outputting a level-control halting signal to said antenna site when a burst carrier transmitter other than said single burst carrier transmitter outputs another burst carrier, and at said antenna site;

performing said level control while receiving said level-control activating signal from said in-station communication apparatus, and halting said level control while receiving said level-control halting signal from said in-station communication apparatus.

10. The method according to claim 9, further comprising the step of, at said antenna site, performing level amplification of said transmission signal with a fixed gain while receiving said level-control halting signal form said in-station communication apparatus, said fixed gain having a level-control value immediately before said antenna site receives said level-control halting signal.

11. A method of transmission level control for a radio communication station having an in-station communication apparatus connected to an antenna site by a transmission line, said in-station communication apparatus including a plurality of burst carrier transmitters for transmitting burst carriers, respectively, and a plurality of continuous carrier transmitters for transmitting continuous carriers, respectively, and said antenna site including a level controller for performing a level control of said transmission signal received from said in-station communication apparatus through said transmission line, said method comprising the steps of:

at said in-station communication apparatus;

combining at least one carrier of said burst carriers and said continuous carriers to output a transmission signal to said antenna site through said transmission line, selecting a single burst carrier transmitter from said burst carrier transmitters, outputting a level-control activating signal to said antenna site when only said single burst carrier transmitter outputs a burst carrier;

outputting said level-control activating signal to said antenna site when said transmission signal includes only a continuous carrier, outputting a level-control halting signal to said antenna site when a burst carrier transmitter other than said single burst carrier transmitter outputs said burst carrier, outputting said level-control halting signal to said antenna site when said transmission signal includes both a burst carrier and a continuous carrier, and at said antenna site;

performing said level control while receiving said level-control activating signal from said in-station communication apparatus, and halting said level control while receiving said communication apparatus.

12. The method according to claim 11, further comprising the step of:

at said antenna site, performing level amplification of said transmission signal with a fixed gain while receiving said level-control halting signal from said in-station communication apparatus, said fixed gain having a level-control value immediately before said antenna site receives said level-control halting signal.

* * * * *